United States Patent
Singh

(10) Patent No.: US 11,907,050 B1
(45) Date of Patent: Feb. 20, 2024

(54) AUTOMATED EVENT ANALYSIS

(71) Applicant: GM Cruise Holdings LLC, San Francisco, CA (US)

(72) Inventor: Ishan Singh, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 12 days.

(21) Appl. No.: 17/945,920

(22) Filed: Sep. 15, 2022

(51) Int. Cl.
*G06F 11/07* (2006.01)
*G06F 11/36* (2006.01)

(52) U.S. Cl.
CPC ........ *G06F 11/076* (2013.01); *G06F 11/0739* (2013.01); *G06F 11/3688* (2013.01)

(58) Field of Classification Search
CPC . G06F 11/0739; G06F 11/076; G06F 11/3688
See application file for complete search history.

(56) References Cited

U.S. PATENT DOCUMENTS 10,169,219 B2 * 1/2019 Rabin ................. G06F 11/3476

OTHER PUBLICATIONS

Hofer P, Gnedt D, Mössenbock H. "Lightweight Java Profiling with Partial Safepoints and Incremental Stack Tracing." In Proceedings of the 6th ACM/SPEC International Conference on Performance Engineering; Jan. 31, 2015; pp. 75-86. (Year: 2015).*

* cited by examiner

*Primary Examiner* — Joseph R Kudirka
(74) *Attorney, Agent, or Firm* — Novak Druce Carroll LLP

(57) ABSTRACT

Aspects of the subject technology relate to systems, methods, and computer-readable media for diagnosing faults in a software stack by running a subset of processes of the software stack. An existence of a fault associated with running a software stack is determined. The software stack includes a plurality of dependent processes. An incrementing larger subset of the software stack is run according to one or more error thresholds associated with executing corresponding dependent processes in the incrementing larger subset. The incrementing larger subset includes an increasing number of processes of the plurality of dependent processes. One or more sources of the fault are diagnosed based on the running of the incrementing larger subset of the software stack.

20 Claims, 5 Drawing Sheets

Figure 1:
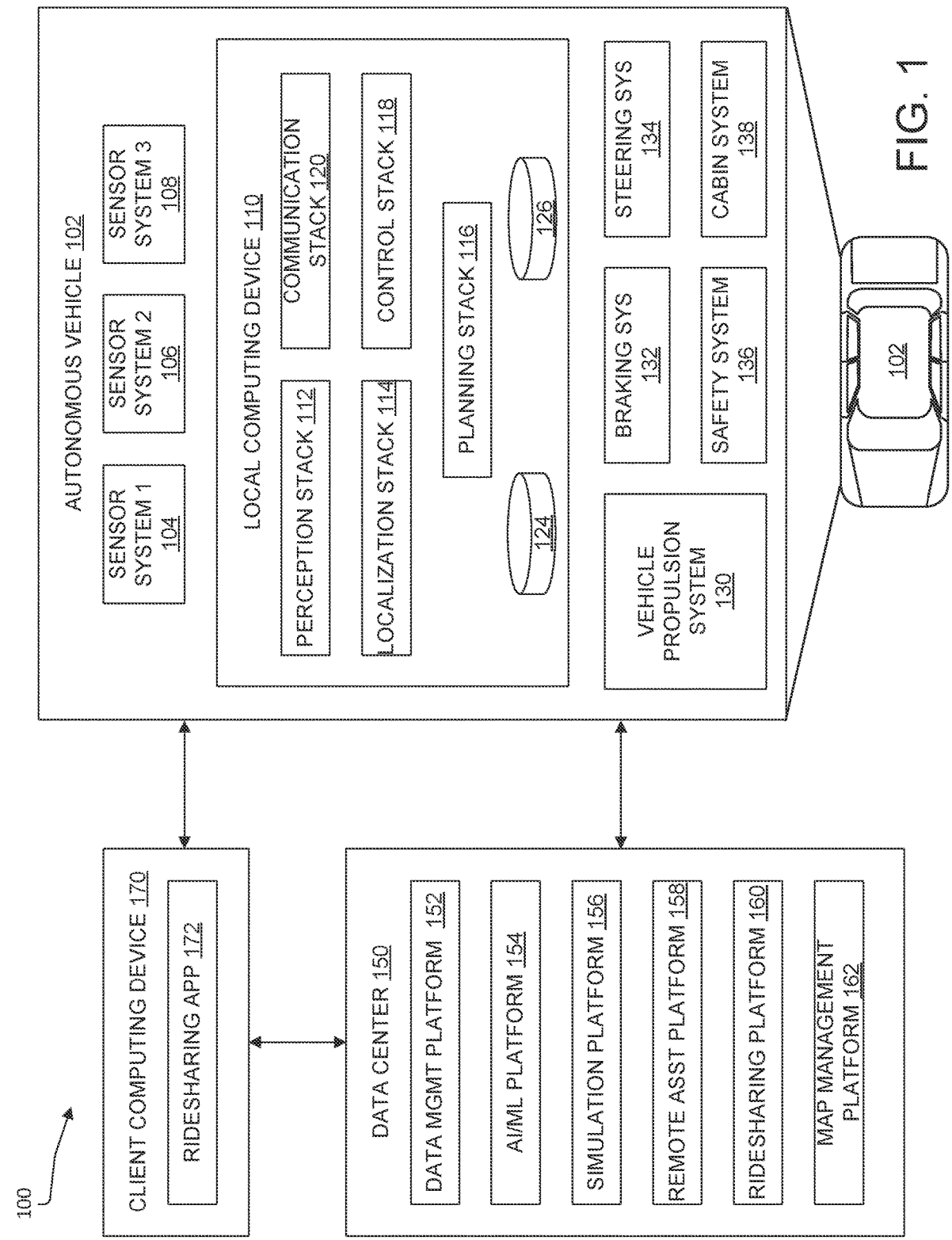
Figure 2:
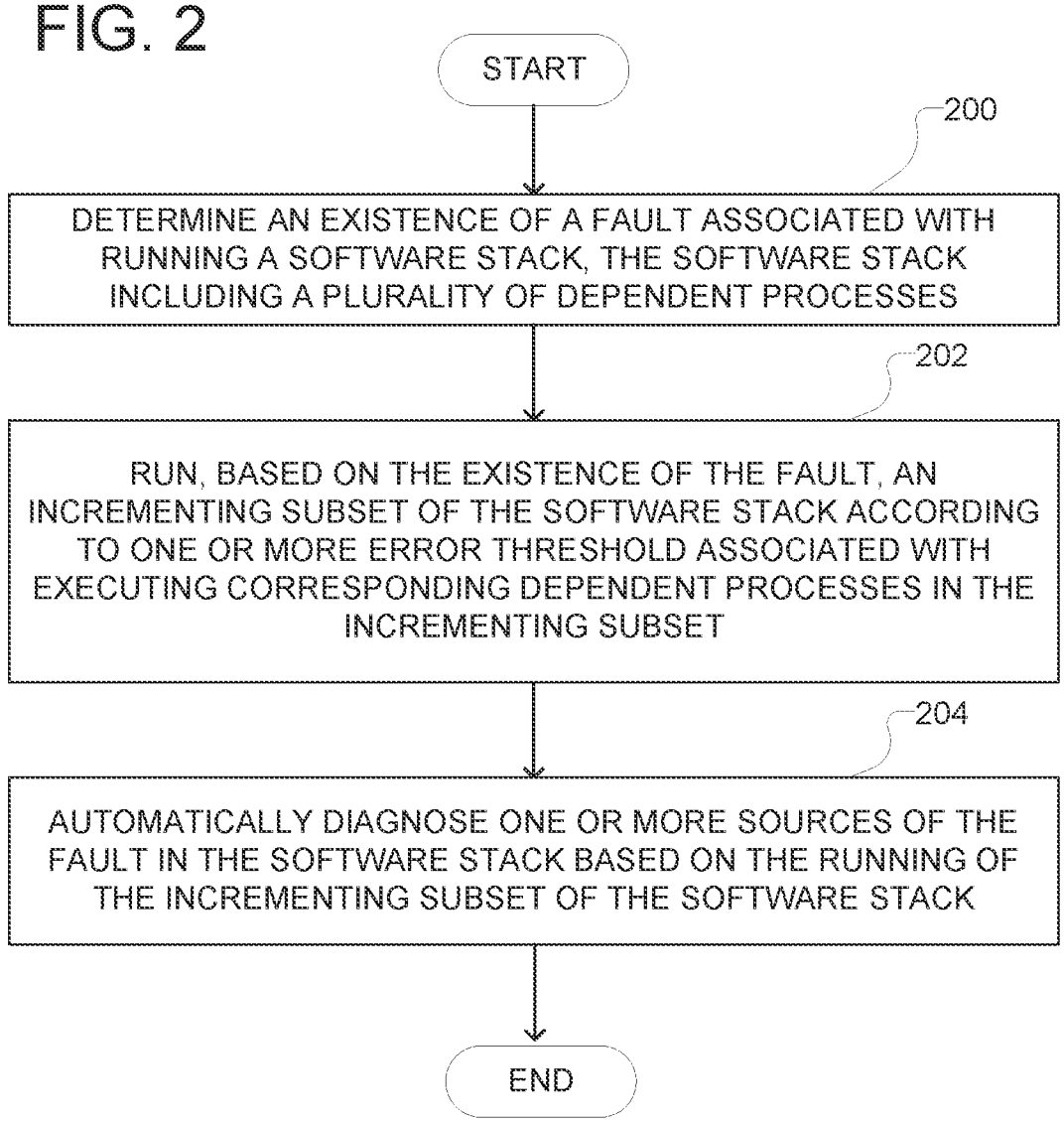
Figure 3:
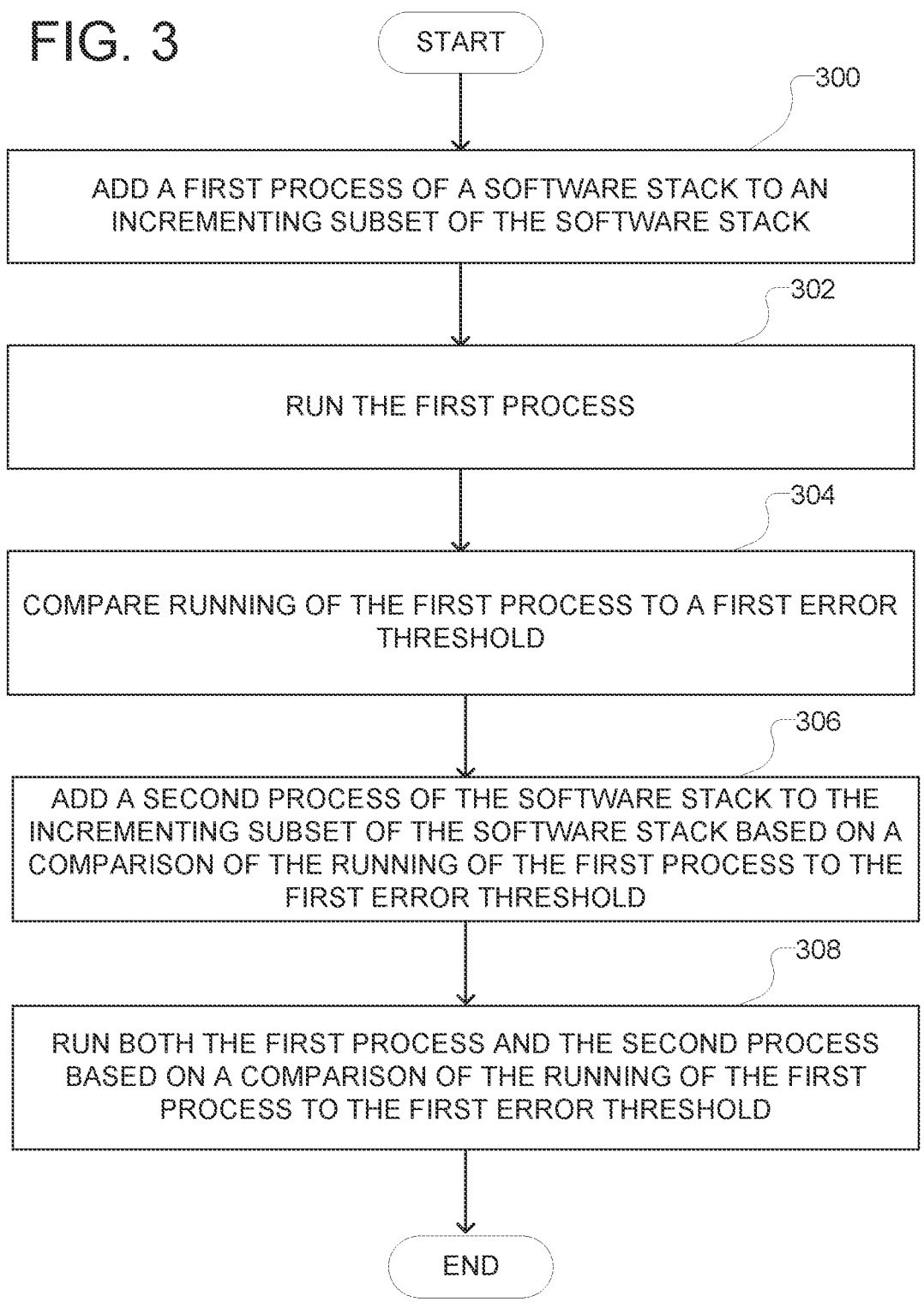
Figure 4:
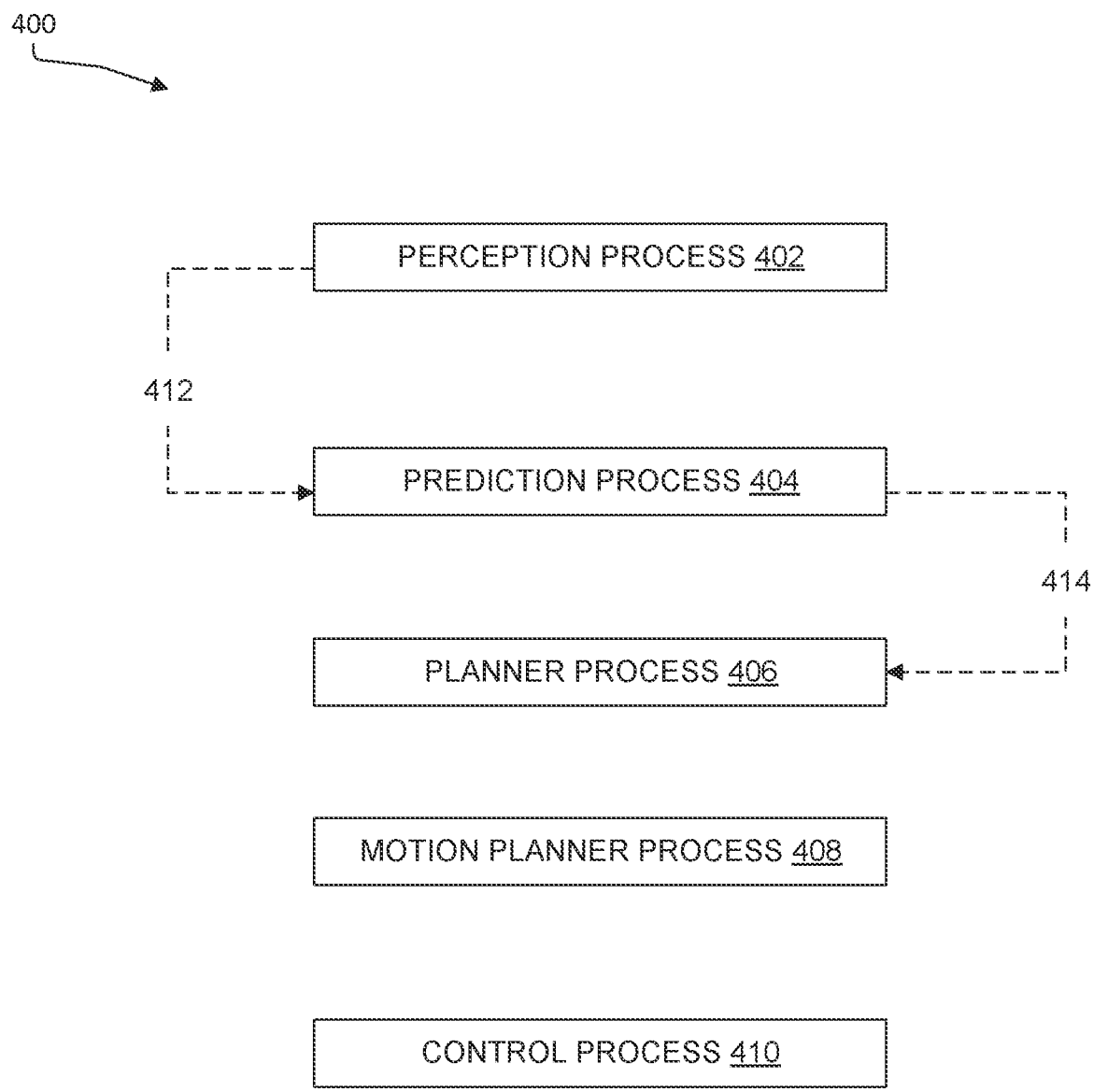
Figure 5:
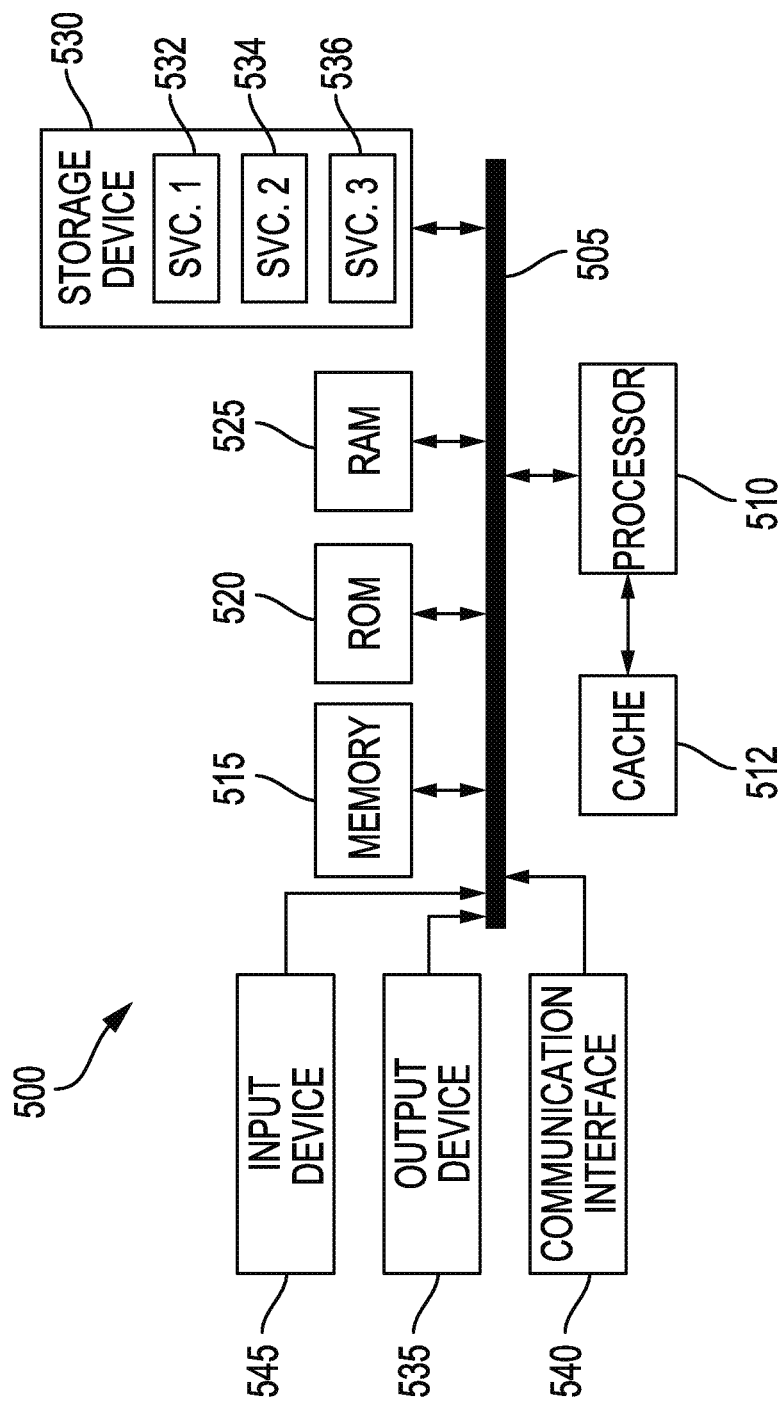

AUTOMATED EVENT ANALYSIS
>
> ## BACKGROUND
>
> ### 1. Technical Field
>
> The present disclosure generally relates to diagnosing faults in a software stack by iteratively running subset processes of the software stack and, more specifically, to iteratively running an incrementing larger subset of the software stack to diagnose faults in the software stack.
>
> ### 2. Introduction
>
> An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.
>
> ## BRIEF DESCRIPTION OF THE DRAWINGS
>
> The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:
>
> FIG. 1 illustrates an example system environment that can be used to facilitate autonomous vehicle (AV) dispatch and operations, according to some examples of the present disclosure;
>
> FIG. 2 illustrates a flowchart for an example method of iteratively running an incrementing larger subset of a software stack to identify a fault associated with the software stack, according to some examples of the present disclosure;
>
> FIG. 3 illustrates a flowchart for an example method of incrementing a subset of a software stack and incrementally running the incrementing larger subset of the software stack, according to some examples of the present disclosure;
>
> FIG. 4 illustrates a conceptual flow of incrementing a subset of an AV software stack, according to some examples of the present disclosure; and
>
> FIG. 5 illustrates an example processor-based system with which some aspects of the subject technology can be implemented, according to some examples of the present disclosure.
>
> ## DETAILED DESCRIPTION
>
> The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.
>
> One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.
>
> As discussed previously, a software stack can be used to control an autonomous vehicle. In particular, a software stack can include various dependent processes that can be implemented to control an autonomous vehicle. In developing autonomous vehicles, numerous tests are run that generate a large amount of data through the implementation of the software stack. Faults found in or otherwise associated with the software stack can be identified form such information. In turn, the software stack and other applicable systems can be modified to account for such identified errors.
>
> Identifying faults associated with a software stack is a rigorous process from both a time perspective and a resource perspective. Specifically, often a software stack has to be rerun from end to end to identify a fault that occurred during execution of the stack. Further, one or more experts have to manually inspect the results of each process in the stack from end to end to diagnose the fault. This is problematic due to the large amount of consumed resources and time. Specifically, in the autonomous vehicle space and with reference to testing, due to both the large amount of data included in running a software stack for a test, and the sheer volume of tests that are run, it is very difficult to efficiently identify faults associated with a software stack.
>
> The disclosed technology addresses the problems associated with analyzing test events to identify faults by iteratively running an incrementing larger subset of the software stack. In turn, the stack does not need to be rerun in its entirety, e.g. as part of an automated event analysis, in order to identify sources of a fault. While the present technology is described with respect to software stacks, the technology can be applied to an applicable system with interacting components. For example, the technology described herein can be applied in debugging a hardware system.
>
> FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.
>
> In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 102 can navigate about roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

AV 102 can also include several mechanical systems that can be used to maneuver or operate AV 102. For instance, the mechanical systems can include vehicle propulsion system 130, braking system 132, steering system 134, safety system 136, and cabin system 138, among other systems. Vehicle propulsion system 130 can include an electric motor, an internal combustion engine, or both. The braking system 132 can include an engine brake, a wheel braking system (e.g., a disc braking system that utilizes brake pads), hydraulics, actuators, and/or any other suitable componentry configured to assist in decelerating AV 102. The steering system 134 can include suitable componentry configured to control the direction of movement of the AV 102 during navigation. Safety system 136 can include lights and signal indicators, a parking brake, airbags, and so forth. The cabin system 138 can include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a planning stack 116, a control stack 118, a communications stack 120, an High Definition (HD) geospatial database 122, and an AV operational database 124, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 122, other components of the AV, and other data sources (e.g., the data center 150, the client computing device 170, third-party data sources, etc.). The perception stack 112 can detect and classify objects and determine their current and predicted locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth.

Mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 122 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The planning stack 116 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 102 from one point to another. The planning stack 116 can determine multiple sets of one or more mechanical operations that the AV 102 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 116 can select from multiple backup plans to carry out. For example, while preparing to change lanes to turn right at an intersection, another vehicle may aggressively cut into the destination lane, making the lane change unsafe. The planning stack 116 could have already determined an alternative plan for such an event, and upon its occurrence, help to direct the AV 102 to go around the block instead of blocking a current lane while waiting for an opening to change lanes.

The control stack 118 can manage the operation of the vehicle propulsion system 130, the braking system 132, the steering system 134, the safety system 136, and the cabin system 138. The control stack 118 can receive sensor signals from the sensor systems 104-108 as well as communicate with other stacks or components of the local computing device 110 or a remote system (e.g., the data center 150) to effectuate operation of the AV 102. For example, the control stack 118 can implement the final path or actions from the multiple paths or actions provided by the planning stack 116. This can involve turning the routes and decisions from the planning stack 116 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 122 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 124 can store raw AV data generated by the sensor systems 104-108 and other components of the AV 102 and/or data received by the AV 102 from remote systems (e.g., the data center 150, the client computing device 170, etc.). In some embodiments, the raw AV data can include HD LIDAR point cloud data, image or video data, RADAR data, GPS data, and other sensor data that the data center 150 can use for creating or updating AV geospatial data as discussed further below with respect to FIG. 5 and elsewhere in the present disclosure.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes one or more of a data management platform 152, an Artificial Intelligence/Machine Learning (AI/ML) platform 154, a simulation platform 156, a remote assistance platform 158, a ridesharing platform 160, and a map management platform 162, among other systems.

Data management platform 152 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102 and from third party sources, including rendering geospatial information and road infrastructure (e.g., streets, lanes, crosswalks, traffic lights, stop signs, etc.) obtained from the map management platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to be picked up or dropped off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

FIG. 2 illustrates a flowchart for an example method of iteratively running an incrementing larger subset of a software stack to identify a fault associated with the software stack. The method shown in FIG. 2 is provided by way of example, as there are a variety of ways to carry out the method. Additionally, while the example method is illustrated with a particular order of operations, those of ordinary skill in the art will appreciate that FIG. 2 and the modules shown therein can be executed in any order and can include fewer or more modules than illustrated. Each module shown in FIG. 2 represents one or more operations, processes, methods or routines in the method.

At operation 200, it is determined that a fault associated with running a software stack exists. The software stack can include a group of dependent processes, otherwise referred to as stacks, that are run in a specific sequence as part of running the software stack, e.g. in its entirety. Specifically and with reference to a software stack for controlling an AV, the software stack can include applicable processes/stacks, such as the processes, otherwise referred to as stacks, described herein. For example, the software stack can include an applicable combination of a perception stack/process, a localization stack/process, a prediction stack/process, a motion planner stack/process, a control stack/process, and a communication stack/process.

A fault associated with running a software stack can include an applicable fault for causing performance of a software stack to fail to meet a measurable standard or metric. For example, the fault can include that a process is failing to accurately predict within a defined accuracy threshold where a tracked object will eventually be positioned in an AV test. In another example, the fault can include whether an AV correctly executed a planned path within a specific tolerance. As shown through these examples, a software stack for controlling an AV is complicated and integrates a large number of dependent processes. Accordingly, it becomes very difficult to dedicate the resources for discovering a fault and accurately identifying the source of the fault in the AV software stack.

Whether a fault exists in a software stack can be identified by running the software stack in its entirety. Specifically, an existence of a fault in a software stack can be determined by running the software stack in its entirety according to a specific sequence of processes in the software stack. Further, whether a fault exists in a software stack can be identified by comparing multiple instances of running the software stack, e.g. over a plurality of different tests. For example, a large number of tests can be run as part of integrating a component to a software stack for controlling an AV. As follows, a score can be generated for each test and the scores can be compared to determine which tests are associated with faults. For example, if a score regression is identified for a test, e.g. from a mean score or predefined score threshold, then the test can be identified as being associated with a fault. As follows, the technology described herein can be applied to automatically diagnose the source of the fault in the test while conserving resources. This is advantageous as often times thousands of tests are run and compared, leading to the identification of numerous tests with faults.

At operation 202, an incrementing larger subset of the software stack is run based on the existence of the fault. Specifically, the incrementing larger subset of the software stack can be iteratively run if it is found that a fault exists for the software stack. More specifically, data used in running the software stack that led to the fault can be used in iteratively running the incrementing larger subset of the software stack. For example, data of a test can be used to run an AV software stack as part of iteratively running an incrementing larger subset of the AV software stack, if it is determined that the test led to or is otherwise associated with a fault.

In iteratively running the software stack, processes in the software stack can be run repeatedly without actually running the software stack in its entirety. In particular, a subset of the software stack can be run repeatedly without actually running the software stack in its entirety. A subset of the software stack, as used herein can include an applicable number of processes, e.g. dependent processes, that form part of the software stack. For example, a subset of an AV software stack can include a single perception process. In another example, a subset of an AV software stack can include a perception process and a prediction process that are run in succession according to a defined sequence of running processes in the AV software stack.

A subset of the software stack can be iteratively run by running an incrementing larger subset of the software stack. An incrementing larger subset of the software stack, as used herein and as will be discussed in greater detail later, includes a subset of the software stack that changes with the addition of more processes to the subset of the software stack. In particular, processes can be added to the incrementing larger subset of the software stack to increase the number of processes that ultimately form the subset of the software stack. As follows, the subset of the software stack can be run, e.g. iteratively run, each time one or more processes are added to the subset of the software stack.

The subset of the software stack can be incremented and iteratively run to identify a source of the fault associated with the software stack. Specifically, a process in a subset of the software stack can be run to determine whether it is the source of the fault. Subsequently, if it is determined that the process is not the source of the fault, then another process can be added to the subset of the software stack. As follows, it can be determined if the added process is the source of the fault. This process can continue while refraining from running the full software stack. This is advantageous as it can conserve resources used in executing the software stack in its entirety to identify a source of the fault. For example. AV tests that exhibit regressive scores can be iteratively run with an incremented subset to identify a subset of AV stack that led to the fault in the AV test, without running the entire AV stack. Further, this can save human resources as an expert is not needed to determine which system is at fault.

The subset of the software stack can be incremented and iteratively run according to one or more error thresholds. An error threshold can define one or more conditions that should be met in order to determine whether to add a process to the subset of the software stack and run the incremented subset of the software stack with the added process. Specifically, an error threshold can define one or more conditions with respect to a running of a process or an output of the process that should be met in determining whether to add a process to the subset of the software stack. More specifically, an error threshold can indicate that one or more processes in a subset of the software stack are not a source of error and that a process should be added to the subset of the software stack for rerunning of the subset.

An error threshold can be specific to a process of a software stack. In turn, an error threshold that is specific to a process in a subset of the software stack can be analyzed with respect to running of the process in the subset to determine whether to add an additional process to the subset. More specifically, an error threshold that is specific to a process can be used to determine whether the process is a source of the fault in the software stack. As follows, based on whether the process is identified as the source of the fault in the software stack according to the error threshold, additional processes can be added to the subset of the software stack and rerun as part of an incremented subset of the software stack.

Processes can be added to the incremented subset of the software stack based on an order of the processes in running the software stack. In particular, processes can be added to the subset of the software stack based on an order of the processes in running the software stack from a certain point to completion. For example, a first process in the software stack can be the first process added to or otherwise forming the subset of the software stack. In turn, a second process that is immediately after the first process in the software stack can be added to the subset of the software stack. In another example, a process in the middle of the software stack can be the first process added to the subset of the software stack. In turn, a process that follows the process in the middle of the software stack can be added to the subset of the software stack. In yet another example, a last process at the end of the software stack can be the first process added to the subset of the software stack. In turn, a process that precedes the last process can be added to the subset of the software stack.

Further in running the incrementing subset of the software stack, processes in the software stack can be run in isolation. Specifically, in running processes in isolation, an output from a first process can be used as input to a second process. In turn, the second process can be run in isolation, e.g. without rerunning the first process.

Returning back to the flowchart shown in FIG. 2, at operation 204, one or more sources of the fault in the software stack are automatically diagnosed. Specifically, one or more sources of the fault are automatically diagnosed based on the iterative running of the incrementing larger subset of the software stack. More specifically, one or more sources of the fault are automatically diagnosed based on the iterative running of the incrementing larger subset of the software stack without running the software stack in its entirety. This is advantageous, as it conserves resources that would otherwise go into running the software stack in its entirety to determine a source of the fault. Further, this is advantageous, as it conserves human resources/utilization that would go into identifying a fault.

In determining a source of the fault based on iterative running of the incrementing larger subset of the software stack, both the running of processes and the output of running the processes can be analyzed. In particular, both characteristics of running a process and the output of running the process can be compared to an error threshold to determine whether the process is a source of the fault. For example, if a process is run and fails to produce an output in comparison to a threshold output, then the process can be determined as a source of the fault in the software stack.

The disclosure now continues with a further discussion of incrementing a subset of a software stack and in particular in the context of an AV software stack. Specifically, FIG. 3 illustrates a flowchart for an example method of incrementing a subset of a software stack and incrementally running the incrementing larger subset of the software stack. FIG. 4 illustrates a conceptual flow 400 of incrementing a subset of an AV software stack. The method shown in FIG. 3 is provided by way of example, as there are a variety of ways to carry out the method. Additionally, while the example method is illustrated with a particular order of operations, those of ordinary skill in the art will appreciate that FIG. 3 and the modules shown therein can be executed in any order and can include fewer or more modules than illustrated. Each module shown in FIG. 3 represents one or more operations, processes, methods or routines in the method.

The example AV software stack shown in FIG. 4 includes applicable processes that can be used in controlling an AV, such as the stacks shown in FIG. 1. Specifically, the example AV software stack shown in FIG. 4 includes a perception process 402, a prediction process 404, a planner process 406, a motion planner process 408, and a control process 410.

The perception process 402 functions to access sensor data gathered by an AV. The perception process 402 can fuse the sensor data. From the sensor data, the perception process 402 can track objects. Specifically, the perception process 402 can identify where tracked objects are in a field of view, e.g. relative to the AV.

The prediction process 404 functions to predict where objects will be in a field of view. Specifically, the prediction process 404 can predict the location of objects that are not tracked by the perception process 402. The prediction process 404 can predict the location of objects based on the tracked object output of the perception process 402.

The planner process 406 functions to identify a path for the AV. Specifically, the planner process 406 functions to identify a path for the AV based on either or both the output of the perception process 402 and the prediction process 404. In identifying a path for the AV, the planner process can weigh various moves by the AV against costs with respect to the output of either or both the perception process 402 and the prediction process 404.

The motion planner process 408 functions to identify a refined path for the AV. In particular, the motion planner process 408 functions to identify a refined path for the AV with respect to the path identified by the planner process 406. A refined path developed by the motion planner process 408 can include a path that is planned according to smaller time operations and smaller distances in comparison to the scheme that is used to develop the path by the planner process 406.

The control process 410 functions to communicate with control systems of the AV to implement the plan developed by either or both the planner process 406 and the motion planner process 408. Specifically, the control process 410 can communicate values of parameters for controlling the AV to applicable systems for controlling the AV. For example, the control process 410 can specify to an acceleration controller of the AV to accelerate at 10%.

Returning back to FIG. 3, at operation 300, a first process of a software stack is added to an incrementing larger subset of the software stack. The first process can be the first process that is actually run when executing the software stack. Alternatively, the first process that is added to the incrementing larger subset of the software stack is not actually the first process sin the software stack. For example, the first process that is added to the incrementing larger subset of the software stack can be the motion planner process 408 in the software stack shown in FIG. 4.

At operation 302, the first process is run. Specifically, the first process is run as part of iteratively running the incrementing larger subset of the software stack. At operation 304, the running of the first process is compared to a first error threshold 304. Specifically, either or both characteristics of the actual running of the first process and the output of the first process can be compared to the first error threshold. In comparing running of a process to an error threshold, one or more detected errors in running of the process can be compared to an error threshold. For example, it can be determined whether the number of detected errors are greater than a specific number, e.g. error threshold.

As discussed previously, an error threshold can be specific to a process run in the incrementing larger subset of the software stack. For example and with reference to the flow 400 shown in FIG. 4, the perception process 402 can be run and compared to an error threshold for the perception process 402 at 412. As discussed previously, an error threshold can be specific to a process, e.g. based on the type of processing that is applied during the process. For example, a perception error that is applied to the perception process 402 can include a different between where a tracked object is predicted to be and where the tracked object actually is. In another example a control error of the control process 410 is an amount of error between a desired path of an AV and a path that is actually achieved by the AV.

Returning back to FIG. 3, at operation 306, a second process of the software stack is added to the incrementing larger subset of the software stack. Specifically, a second process of the software stack can be added to the incrementing larger subset of the software stack based on a comparison of the running of the first process to the first error threshold. In particular, if the error threshold is not met, then the second process of the software stack can be added to the incrementing larger subset of the software stack. For example, and with reference to FIG. 4, the perception process 402 meets the error threshold at 412. As follows, the prediction process 404 is added to the incrementing larger subset of the software stack.

Conversely, if the error threshold is met, then the second process can be left out of the incrementing larger subset of the software stack and the iterative running of the subset can be stopped. This can correspond to finding the source of the fault in the software stack and as such the software stack should no longer be run, thereby conserving resources. For example, if the perception process 402 meets the error threshold, then it can be determined that the perception process is the source of a fault. In turn, the subset of the software stack is not incremented by not adding any more of the processes, e.g. the prediction process 404, to the software stack. As follows, the incrementing larger subset of the software stack is not iteratively run any more.

Alternatively, the subset of the software stack can be incremented even if an error threshold is met. Specifically, if the error threshold is met indicating that the first process is the fault source, the second process can still be added to the incrementing larger subset of the software stack. As follows, the subset of the software stack can be run with the second process. This can be done for fault tolerance purposes. Fault tolerance as used herein, is the running of a process with known error, otherwise fault, to determine whether the process can handle the fault. Specifically, the second process can be added to the subset of the software stack and run event if the preceding first process is the source of the fault, in order to see if the second process can be handled or still be run with the fault.

Returning back to FIG. 3, at operation 308, both the first process and the second process are run. Specifically, both the first process and the second process are run based on a comparison of the running of the first process to the first error threshold. This process can continue down the software stack. Specifically, either or both the first process and the second process can be analyzed to determine whether to add a third process to the subset of the software stack and subsequently run the subset including the third process.

With reference to FIG. 4, after the prediction process 404 is added to the subset of the software stack, the subset of the software stack including the perception process 402 and the prediction process 404 is run and compared to one or more error thresholds at 414. Specifically, the perception process 402 can be compared to an error threshold that is specific to the perception process 402 and the prediction process can be compared to an error threshold that is specific to the prediction process 404. Based on the results, then the planner process 406 can be added to the subset of the software stack. In turn, this process can repeat down the software stack, e.g. to the control process 410. Alternatively, the planner process 406 can be excluded from the subset of the software stack and the process of iteratively running a incrementing larger subset of the software stack can end.

FIG. 5 illustrates an example processor-based system with which some aspects of the subject technology can be implemented. For example, processor-based system 500 can be any computing device making up, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (Central Processing Unit (CPU) or processor) 510 and connection 505 that couples various system components including system memory 515, such as Read-Only Memory (ROM) 520 and Random-Access Memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 530 can include software services, servers, services, etc., that when the code that defines such software is executed by the processor 510, it causes the system 500 to perform a function. In some embodiments, a hardware service that performs a particular function can include the software component stored in a computer-readable medium in connection with the necessary hardware components, such as processor 510, connection 505, output device 535, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing operations of the methods disclosed herein. The particular sequence of such executable instructions or associated data structures represents examples of corresponding acts for implementing the functions described in such operations.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A method comprising: determining an existence of a fault associated with running a software stack, the software stack including a plurality of dependent processes that are executed in a specific sequence of running the software stack in its entirety; running, based on the existence of the fault, an incrementing larger subset of the software stack according to one or more error thresholds associated with executing corresponding dependent processes in the incrementing larger subset of the software stack, wherein the incrementing larger subset of the software stack includes an increasing number of processes of the plurality of dependent processes; and automatically diagnosing one or more sources of the fault in the software stack based on running of the incrementing larger subset of the software stack.

Aspect 2. The method of Aspect 1, wherein the running of the incrementing larger subset of the software stack comprises iteratively running the incrementing larger subset of the software stack by: adding a first process of the software stack to the incrementing larger subset of the software stack; running the first process; comparing a first number of errors from the running of the first process in the incrementing larger subset of the software stack to a first error threshold of one or more error thresholds; adding a second process of the software stack to the incrementing larger subset of the software stack based on a comparison of the first number of errors to the first error threshold; and running both the first process and the second process according to a corresponding portion of the specific sequence of running the software stack in its entirety based on the comparison of the first number of errors to the first error threshold.

Aspect 3. The method of Aspects 1 and 2, wherein the second process is directly after the first process in the specific sequence of running the software stack in its entirety.

Aspect 4. The method of Aspects 1 through 3, further comprising: comparing a second number of errors from running of the second process during the running of both the first process and the second process together to a second error threshold of the one or more error thresholds; and controlling the iterative running of the incrementing larger subset of the software stack based, at least in part, on a comparison of the second number of errors to the second error threshold.

Aspect 5. The method of Aspects 1 through 4, further comprising stopping the iterative running of the incrementing larger subset of the software stack if at least one of the one or more error thresholds is met.

Aspect 6. The method of Aspects 1 through 5, further comprising continuing the iterative running of the incrementing larger subset of the software stack irrespective of whether at least one of the one or more error thresholds is met.

Aspect 7. The method of Aspects 1 through 6, wherein the existence of the fault is determined by running the software stack in its entirety according to the specific sequence.

Aspect 8. The method of Aspects 1 through 7, wherein each of the one or more error thresholds are specific to a corresponding process of the plurality of dependent processes in the software stack.

Aspect 9. The method of Aspects 1 through 8, wherein the software stack is associated with controlled operation of an autonomous vehicle.

Aspect 10. A system comprising: one or more processors; and at least one computer-readable storage medium having stored therein instructions which, when executed by the one or more processors, cause the one or more processors to: determine an existence of a fault associated with running a software stack, the software stack including a plurality of dependent processes that are executed in a specific sequence of running the software stack in its entirety; run, based on the existence of the fault, an incrementing larger subset of the software stack according to one or more error thresholds associated with executing corresponding dependent processes in the incrementing larger subset of the software stack, wherein the incrementing larger subset of the software stack includes an increasing number of processes of the plurality of dependent processes; and automatically diagnose one or more sources of the fault in the software stack based on running of the incrementing larger subset of the software stack.

Aspect 11. The system of Aspect 10, wherein the incrementing larger subset of the software stack is iteratively run and the instructions further cause the one or more processors, as part of iterative running of the incrementing larger subset of the software stack, to: add a first process of the software stack to the incrementing larger subset of the software stack; run the first process; compare a first number of errors from the running of the first process to a first error threshold of one or more error thresholds; add a second process of the software stack to the incrementing larger subset of the software stack based on a comparison of the first number of errors to the first error threshold; and run both the first process and the second process according to a corresponding portion of the specific sequence of running the software stack in its entirety based on a comparison of the first number of errors to the first error threshold.

Aspect 12. The system of Aspects 10 and 11, wherein the second process is directly after the first process in the specific sequence of running the software stack in its entirety.

Aspect 13. The system of Aspects 10 through 12, wherein the instructions further cause the one or more processors to: compare a second number of errors from running of the second process during the running of both the first process and the second process together to a second error threshold of the one or more error thresholds; and control the iterative running of the incrementing larger subset of the software stack based, at least in part, on a comparison of the second number of errors to the second error threshold.

Aspect 14. The system of Aspects 10 through 13, wherein the instructions further cause the one or more processors to stop the iterative running of the incrementing larger subset of the software stack if at least one of the one or more error thresholds is met.

Aspect 15. The system of Aspects 10 through 14, wherein the instructions further cause the one or more processors to continue the iterative running of the incrementing larger subset of the software stack irrespective of whether at least one of the one or more error thresholds is met.

Aspect 16. The system of Aspects 10 through 15, wherein the existence of the fault is determined by running the software stack in its entirety according to the specific sequence.

Aspect 17. The system of Aspects 10 through 16, wherein each of the one or more error thresholds are specific to a corresponding process of the plurality of dependent processes in the software stack.

Aspect 18. The system of Aspects 10 through 16, wherein the software stack is associated with controlled operation of an autonomous vehicle.

Aspect 19. A non-transitory computer-readable storage medium having stored therein instructions which, when executed by one or more processors, cause the one or more processors to: determine an existence of a fault associated with running a software stack, the software stack including a plurality of dependent processes that are executed in a specific sequence of running the software stack in its entirety; run, based on the existence of the fault, an incrementing larger subset of the software stack according to one or more error thresholds associated with executing corresponding dependent processes in the incrementing larger subset of the software stack, wherein the incrementing larger subset of the software stack includes an increasing number of processes of the plurality of dependent processes; and automatically diagnose one or more sources of the fault in the software stack based on running of the incrementing larger subset of the software stack.

Aspect 20. The non-transitory computer-readable storage medium of Aspect 19, wherein the incrementing larger subset of the software stack is iteratively run and the instructions further cause the one or more processors, as part of iterative running of the incrementing larger subset of the software stack, to: add a first process of the software stack to the incrementing larger subset of the software stack; run the first process; compare a first number of errors from the running of the first process to a first error threshold; add a second process of the software stack to the incrementing larger subset of the software stack based on a comparison of the first number of errors to the first error threshold; and run both the first process and the second process according to a corresponding portion of the specific sequence of running the software stack in its entirety based on the comparison of the first number of errors to the first error threshold.

Aspect 21. A system comprising means for performing a method according to any of Aspects 1 through 9.

What is claimed is:
1. A method comprising:
  determining an existence of a fault associated with running a software stack, the software stack including a plurality of dependent processes that are executed in a specific sequence of running the software stack in its entirety;
  running, based on the existence of the fault, an incrementing larger subset of the software stack according to one or more error thresholds associated with executing corresponding dependent processes in the incrementing larger subset of the software stack, wherein the incrementing larger subset of the software stack includes an increasing number of processes of the plurality of dependent processes; and
automatically diagnosing one or more sources of the fault in the software stack based on running of the incrementing larger subset of the software stack.

2. The method of claim 1, wherein the running of the incrementing larger subset of the software stack comprises iteratively running the incrementing larger subset of the software stack by:
adding a first process of the software stack to the incrementing larger subset of the software stack;
running the first process;
comparing a first number of errors from the running of the first process in the incrementing larger subset of the software stack to a first error threshold of one or more error thresholds;
adding a second process of the software stack to the incrementing larger subset of the software stack based on a comparison of the first number of errors to the first error threshold; and
running both the first process and the second process according to a corresponding portion of the specific sequence of running the software stack in its entirety based on the comparison of the first number of errors to the first error threshold.

3. The method of claim 2, wherein the second process is directly after the first process in the specific sequence of running the software stack in its entirety.

4. The method of claim 2, further comprising:
comparing a second number of errors from running of the second process during the running of both the first process and the second process together to a second error threshold of the one or more error thresholds; and
controlling the iterative running of the incrementing larger subset of the software stack based, at least in part, on a comparison of the second number of errors to the second error threshold.

5. The method of claim 2, further comprising stopping the iterative running of the incrementing larger subset of the software stack if at least one of the one or more error thresholds is met.

6. The method of claim 2, further comprising continuing the iterative running of the incrementing larger subset of the software stack irrespective of whether at least one of the one or more error thresholds is met.

7. The method of claim 1, wherein the existence of the fault is determined by running the software stack in its entirety according to the specific sequence.

8. The method of claim 1, wherein each of the one or more error thresholds are specific to a corresponding process of the plurality of dependent processes in the software stack.

9. The method of claim 1, wherein the software stack is associated with controlled operation of an autonomous vehicle.

10. A system comprising:
one or more processors; and
at least one computer-readable storage medium having stored therein instructions which, when executed by the one or more processors, cause the one or more processors to:
determine an existence of a fault associated with running a software stack, the software stack including a plurality of dependent processes that are executed in a specific sequence of running the software stack in its entirety;
run, based on the existence of the fault, an incrementing larger subset of the software stack according to one or more error thresholds associated with executing corresponding dependent processes in the incrementing larger subset of the software stack, wherein the incrementing larger subset of the software stack includes an increasing number of processes of the plurality of dependent processes; and
automatically diagnose one or more sources of the fault in the software stack based on running of the incrementing larger subset of the software stack.

11. The system of claim 10, wherein the incrementing larger subset of the software stack is iteratively run and the instructions further cause the one or more processors, as part of iterative running of the incrementing larger subset of the software stack, to:
add a first process of the software stack to the incrementing larger subset of the software stack;
run the first process;
compare a first number of errors from the running of the first process to a first error threshold of one or more error thresholds;
add a second process of the software stack to the incrementing larger subset of the software stack based on a comparison of the first number of errors to the first error threshold; and
run both the first process and the second process according to a corresponding portion of the specific sequence of running the software stack in its entirety based on a comparison of the first number of errors to the first error threshold.

12. The system of claim 11, wherein the second process is directly after the first process in the specific sequence of running the software stack in its entirety.

13. The system of claim 11, wherein the instructions further cause the one or more processors to:
compare a second number of errors from running of the second process during the running of both the first process and the second process together to a second error threshold of the one or more error thresholds; and
control the iterative running of the incrementing larger subset of the software stack based, at least in part, on a comparison of the second number of errors to the second error threshold.

14. The system of claim 11, wherein the instructions further cause the one or more processors to stop the iterative running of the incrementing larger subset of the software stack if at least one of the one or more error thresholds is met.

15. The system of claim 11, wherein the instructions further cause the one or more processors to continue the iterative running of the incrementing larger subset of the software stack irrespective of whether at least one of the one or more error thresholds is met.

16. The system of claim 10, wherein the existence of the fault is determined by running the software stack in its entirety according to the specific sequence.

17. The system of claim 10, wherein each of the one or more error thresholds are specific to a corresponding process of the plurality of dependent processes in the software stack.

18. The system of claim 10, wherein the software stack is associated with controlled operation of an autonomous vehicle.

19. A non-transitory computer-readable storage medium having stored therein instructions which, when executed by one or more processors, cause the one or more processors to:

determine an existence of a fault associated with running a software stack, the software stack including a plurality of dependent processes that are executed in a specific sequence of running the software stack in its entirety;

run, based on the existence of the fault, an incrementing larger subset of the software stack according to one or more error thresholds associated with executing corresponding dependent processes in the incrementing larger subset of the software stack, wherein the incrementing larger subset of the software stack includes an increasing number of processes of the plurality of dependent processes; and automatically diagnose one or more sources of the fault in the software stack based on running of the incrementing larger subset of the software stack.

20. The non-transitory computer-readable storage medium of claim 19, wherein the incrementing larger subset of the software stack is iteratively run and the instructions further cause the one or more processors, as part of iterative running of the incrementing larger subset of the software stack, to:

add a first process of the software stack to the incrementing larger subset of the software stack;

run the first process;

compare a first number of errors from the running of the first process to a first error threshold;

add a second process of the software stack to the incrementing larger subset of the software stack based on a comparison of the first number of errors to the first error threshold; and run both the first process and the second process according to a corresponding portion of the specific sequence of running the software stack in its entirety based on the comparison of the first number of errors to the first error threshold.

* * * * *